Patented Sept. 30, 1941

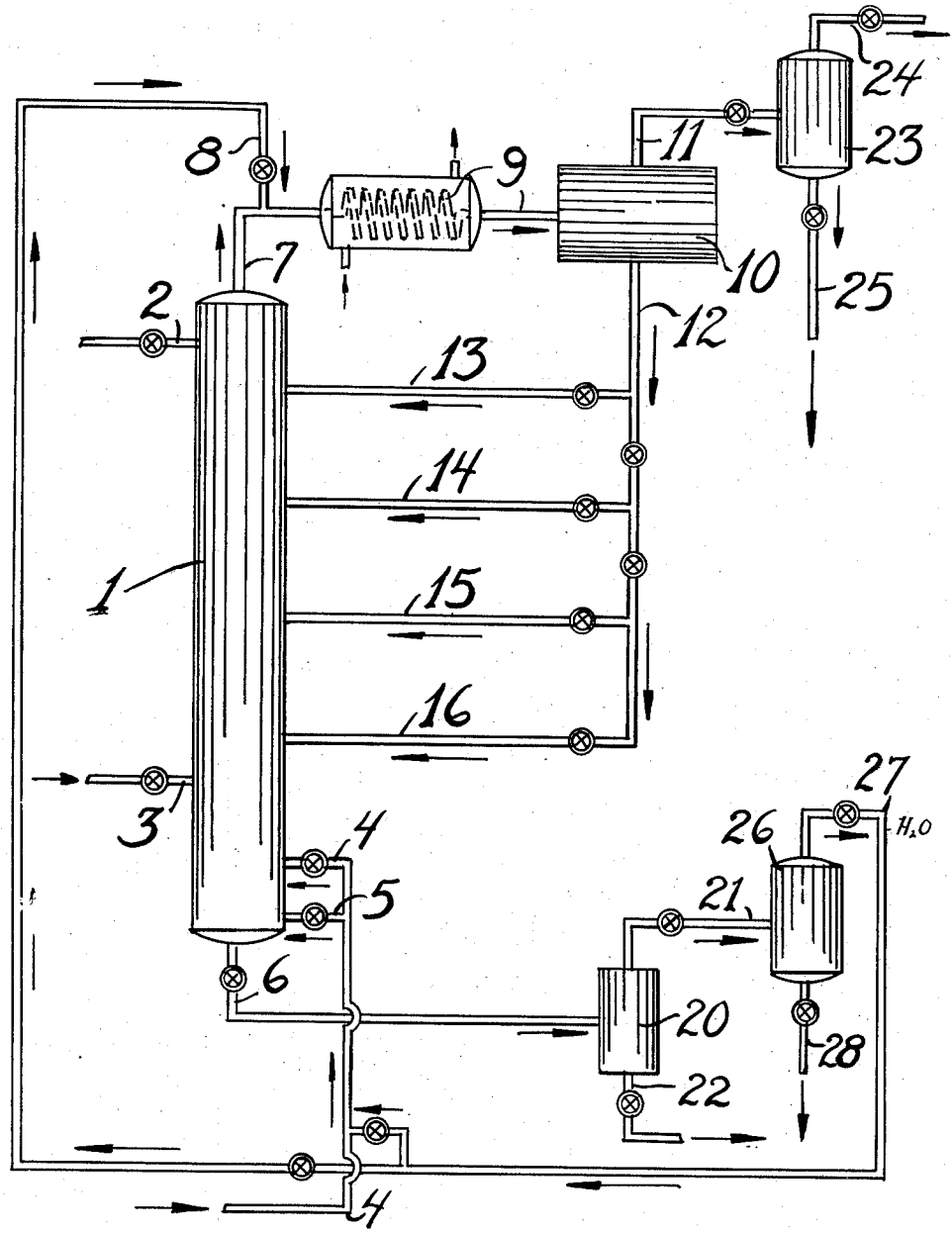

2,257,547

UNITED STATES PATENT OFFICE 2,257,547

SOLVENT TREATING MINERAL OILS

Gordon W. Duncan, Scotch Plains, N. J., assignor to Standard Oil Development Company, a corporation of Delaware Application March 17, 1939, Serial No. 262,539

4 Claims. (Cl. 196—13)

The present invention relates to the solvent treatment of mineral oils. The invention is especially directed to the solvent treatment of petroleum oils with solvents of the class which have a preferential selectivity for the more aromatic type compounds as compared to the more paraffinic type compounds and in which the separated raffinate phase is separated into a primary raffinate phase and a secondary extract phase which is returned to the solvent treating system at more than one stage.

It is well known in the art to treat mineral oils with various solvents in order to separate them into their respective constituents. For example, it is known to treat petroleum oils with solvents and solvent mixtures selected from the class of solvents which have a preferential selectivity for the more aromatic type or relatively hydrogen poor constituents as compared to the more paraffinic type or relatively hydrogen rich constituents. Solvents of this class are, for example, phenol, furfural, sulfur dioxide, aniline, beta beta dichlor diethyl ether and the like. It is also known to use these solvents in combination with other substances such as liquefied normally gaseous hydrocarbons. The oil and the solvent may be contacted in any suitable manner, as for example, in a single or multi-stage batch operation. The oil and solvent, however, are usually contacted in a countercurrent tower treating operation. In this process the lighter phase, usually the oil, is introduced at the bottom or at an intermediate point in the tower, and the heavier phase, usually the solvent, is introduced at the top of the tower. The respective phases flow countercurrently, contacting each other under conditions to form a raffinate or solvent poor phase and a solvent rich phase or solvent extract phase. The respective phases are separated and are treated in a manner to remove the solvent from the oil, as for example, by distillation, washing and the like.

In these operations it is known to modify the selectivity and solvent power of the solvent by the addition of a solvent modifying agent. Thus, for example, when using phenol, it is known to modify the selectivity and solvent power of the phenol by the addition of a modifying agent such as water. Various processes have also been suggested for the recovery of the primary solvent from the oil without the necessity of distilling the same. For example, it is known to remove the solvent from the oil by re-extracting the separated phases with a secondary solvent which has a preferential selectivity for the oil as compared to the primary solvent.

I have now discovered a process by which I can economically modify the selectivity of the primary solvent and at the same time remove the solvent from the raffinate phase without the necessity of distilling a large proportion of the same.

The process of my invention may be readily understood by reference to the attached drawing illustrating one modification of the same. For the purposes of illustration, it is assumed that the oil feed is a lubricating oil distillate, the selective solvent is phenol and the solvent modifying agent is water. Feed oil is introduced into tower 1 by means of oil feed line 3 and flows upwardly through tower 1 contacting downflowing phenol which is introduced into tower 1 by means of solvent feed line 2. Efficient contact between the countercurrent flowing phases is secured by providing distributing and contacting means within tower 1. Conditions are maintained on tower 1 to secure the formation of a raffinate phase and a solvent extract phase. The solvent extract phase is withdrawn from tower 1 by means of line 6 and introduced into solvent separator 20. The solvent water-free extract is removed from separator 20 by means of line 22. The phenol and water are removed by means of line 21 and introduced into solvent drier 26. Phenolic water is taken overhead from solvent drier 26 by means of line 27 and introduced into tower 1 by means of lines 4 and 5 and into the raffinate phase by means of line 8. The water-free phenol or phenol containing any desirable low water content is removed from solvent drier 26 by means of line 28. The raffinate phase is withdrawn from tower 1 by means of line 7 and mixed with additonal quantities of water which is introduced into line 7 by means of line 8. The mixture is then thoroughly mixed in coil 9 where it may also be either heated or cooled and is then introduced into separator 10. The separated raffinate phase, from which a large proportion of the solvent has been removed, is withdrawn from separator 10 by means of line 11 and introduced into solvent stripper 23. The solvent is removed by means of line 24 and recycled to line 2, or to line 21, depending on its water content, while the solvent-free raffinate is removed from stripper 23 by means of line 25. The separated phenol water phase from separator 10 is withdrawn by means of line 12 and introduced into tower 1 at a multiplicity of stages by means of lines 13, 14, 15, and 16, which are all below the point of introduction of solvent through line 2.

The process of the present invention may be widely varied. Any solvent of the class which has a preferential selectivity for the more aromatic type constituents and whose solvent power may be readily modified by the addition of a solvent modifying agent may be employed. The invention, however, is particularly applicable when employing phenol and utilizing water as the solvent modifying agent. The temperature and pressure conditions will vary, depending upon the particular feed oil being treated, the particular solvent and amount of solvent being used, as well as upon the yield and quality of products desired. In general, atmospheric pressure and a temperature in the range between the temperature at which complete miscibility occurs and the melting point of the solvent are preferred. When using phenol, it is preferred to maintain the temperature in the range from about 90° F. to 250° F.

The quantity of solvent used per volume of oil being treated may also vary within wide limits, depending upon the above named factors. In general, when phenol is employed it is preferred to use from one to four volumes of phenol per volume of oil being treated.

The quantity of water added to the raffinate phase may vary over a wide range, depending upon the particular oil being treated, the solvent being used, and the temperature maintained at the point of withdrawal of the raffinate phase. In general, it is preferred to add from 5% to 20% of water, based upon the total quantity of raffinate withdrawn from tower 1. When using phenol as the selective solvent, it is preferred to add from 8% to 12% of water, based upon the total volume of raffinate.

The mixture of raffinate phase and added water is then heated or cooled to a temperature at which optimum separation occurs between the raffinate phase and the phenolic water phase. For example, when using phenol, it has been found that especially desirable results are secured if a temperature of 175° F. to 200° F. is employed.

The separated phenolic water phase is returned to the countercurrent treating tower preferably at more than one point in the tower below the phenol feed point. The water may be distributed equally at the several points or the quantity may be adjusted to give optimum results depending upon the feed stock, temperatures, yield and quality of oil desired, and the amount of solvent employed. It is preferred to introduce a relatively small amount of the separated phenolic water phase at a point in the tower nearest to the point at which the fresh phenol is introduced. The raffinate phase after separation from the phenolic water phase is treated in any suitable manner to remove the solvent from the raffinate.

The solvent extract phase is likewise treated in any suitable manner to secure a solvent free extract. In general, distillation is preferred. Furthermore, any means may be employed to dry the phenol phenolic water phase removed from the extract. In general, a distillation process is preferred in which the phenolic water is recycled to the countercurrent treating tower and in which it is added to the raffinate phase as described.

In order to further illustrate the invention, the following examples are given which should not be construed in limiting the same in any manner whatsoever:

EXAMPLE 1

A lubricating oil distillate was solvent treated with phenol under conditions in which the raffinate phase contained about 25% of phenol. Various quantities of water were added to the raffinate phase at temperatures of 175° F. and 200° F. and the quantity of phenol separated determined. The results of these operations may be summarized as follows:

| Percent water added based on total raffinate | Percent of total phenol present separated from raffinate at— | |
|---|---|---|
| | 175° F. | 200° F. |
| 0 | 28.0 | 0.0 |
| 2 | 68.8 | 40.0 |
| 4 | 72.0 | 60.8 |
| 6 | 75.2 | 72.0 |
| 8 | 78.4 | 75.2 |
| 10 | 85.2 | 85.2 |
| 15 | 85.2 | 85.2 |

From the above data, it is apparent that when using phenol under the described conditions as the selective solvent, the critical quantity of water is from 10% to 15%, preferably about 10%, based upon the total raffinate.

EXAMPLE 2

A petroleum lubricating oil having a gravity of 32° A. P. I. when treated with phenol in accordance with the process of the present invention, while maintaining a temperature of 175° F. throughout the tower, results in the following material balance:

*Countercurrent treating tower*

| From— | Feed (volumes) | | | From— | Withdrawn (volumes) | | |
|---|---|---|---|---|---|---|---|
| | Oil | Phenol | Water | | Oil | Phenol | Water |
| Oil feed (line 3) | 100 | | | Raffinate phase | 75 | 25 | 0 |
| Solvent feed (line 2) | | 150 | | Extract | 26 | 147 | 18 |
| Phenolic water (lines 4 and 5) | | 1 | 9 | | | | |
| Phenol-water (from 10) | 1 | 21 | 9 | Total | 101 | 172 | 18 |
| Total | 101 | 172 | 18 | | | | |

*Raffinate separator 10*

| From— | Feed (volumes) | | | From— | Withdrawn (volumes) | | |
|---|---|---|---|---|---|---|---|
| | Oil | Phenol | Water | | Oil | Phenol | Water |
| Raffinate phase | 75 | 25 | 0 | Raffinate | 74 | 5 | Trace |
| Water added (line 8) | | 1 | 9 | Phenol-water phase | 1 | 21 | 9 |
| Total | 75 | 26 | 9 | Total | 75 | 26 | 9 |

The process of the present invention is not to be limited by any theory or mode of operation, but only by the following claims in which it is desired to claim all novelty in so far as the prior art permits.

I claim:

1. Solvent treating process comprising contacting a petroleum lubricating oil in a countercurrent treating system with phenol at a temperature in the range from about 90° F. to 250° F. under conditions to form a solvent extract phase and a raffinate phase, separating the solvent extract phase and recovering the extract oil therefrom, separating the raffinate phase and adding thereto from about 5% to 20% of water at a temperature at which the raffinate oil separates from a phenol water phase, separating the raffinate oil, and completely removing the phenol therefrom, separating the phenol-water phase and returning said phase to the countercurrent treating system at a plurality of stages between the point of introduction of the oil feed and the point at which the raffinate phase is withdrawn.

2. Process in accordance with claim 1 in which said temperature for the separation of the raffinate from the phenol-water phase is in the range from 175° F. to 200° F.

3. A solvent treating process comprising contacting a petroleum lubricating oil in a countercurrent treating system with phenol at a temperature in the range from about 90° F. to 250° F. under conditions to form a solvent extract phase and a raffinate phase, separating said solvent extract phase and separating said extract therefrom, removing said raffinate phase and adding thereto from 5% to 20% of water, based upon the total raffinate phase, and subjecting to temperature conditions to secure an optimum phase separation between the raffinate and the phenol-water phase, removing said separated raffinate phase and separating the solvent therefrom, removing said phenol-water phase and returning said phase to the countercurrent treating system at a multiplicity of stages between the point of introduction of the oil feed and the point at which the raffinate phase is withdrawn, in a manner that less than 5% of said separated phenol-water phase is returned nearest the point from which the raffinate phase is withdrawn and the remaining 95% is returned in equal amounts at a plurality of stages between the oil feed inlet and the point at which the raffinate is withdrawn.

4. Solvent treating process comprising contacting a petroleum oil in a countercurrent treating system with a phenol at a temperature in the range from about 90° F. to 250° F. under conditions to form a solvent extract phase and a raffinate phase, separating said solvent extract phase and removing the solvent therefrom, separating said raffinate phase and adding thereto from about 8% to 12% of water based upon the total volume of raffinate phase, maintaining the temperature of the mixture in the range from about 175° F. to 200° F. whereby an oil phase and a phenol-water phase form, removing said oil phase and separating the solvent therefrom, removing said phenol-water phase and returning said phase to the countercurrent treating system at a plurality of stages intermediate the point of introduction of the oil feed and the point at which the phenol is introduced.

GORDON W. DUNCAN.